(12) United States Patent
Feng et al.

(10) Patent No.: US 9,612,459 B2
(45) Date of Patent: Apr. 4, 2017

(54) SILICON OPTICAL MODULATOR USING ASYMMETRIC SHALLOW WAVEGUIDE AND THE METHOD TO MAKE THE SAME

(71) Applicant: LaXense Inc., Walnut, CA (US)

(72) Inventors: Ningning Feng, Arcadia, CA (US); Xiaochen Sun, Chino Hills, CA (US)

(73) Assignee: LAXENSE INC., Walnut, CA (US)

( * ) Notice: Subject to any disclaimer, the term of this patent is extended or adjusted under 35 U.S.C. 154(b) by 54 days.

(21) Appl. No.: 14/321,376

(22) Filed: Jul. 1, 2014

(65) Prior Publication Data
US 2016/0004104 A1    Jan. 7, 2016

(51) Int. Cl.
| G02F 1/25 | (2006.01) |
| G02F 1/225 | (2006.01) |
| G02F 1/025 | (2006.01) |
| G02F 1/015 | (2006.01) |
| G02F 1/21 | (2006.01) |

(52) U.S. Cl.
CPC ............ *G02F 1/025* (2013.01); *G02F 1/2257* (2013.01); *G02F 2001/0152* (2013.01); *G02F 2001/212* (2013.01)

(58) Field of Classification Search
CPC .... G02B 6/423; G02B 6/4249; G02B 6/4206; G02B 6/4214; G02B 6/424; G02B 6/4243; G02F 1/0126; G02F 1/025; G02F 2201/063; H01S 5/1014; H01S 5/141
USPC ............... 385/14, 49, 83; 438/31, 24, 27, 65
See application file for complete search history.

(56) References Cited

U.S. PATENT DOCUMENTS

| 7,116,853 | B2 | 10/2006 | Gunn, III et al. |
| 7,136,544 | B1 | 11/2006 | Gunn, III et al. |
| 7,251,408 | B1 | 7/2007 | Gunn, III et al. |
| 7,280,712 | B2 | 10/2007 | Liu |
| 7,394,948 | B1 | 7/2008 | Zheng et al. |
| 7,747,122 | B2 | 6/2010 | Shetrit et al. |
| 8,149,493 | B2 | 4/2012 | Chen |
| 2005/0179986 | A1* | 8/2005 | Gothoskar .............. G02F 1/025 359/321 |
| 2010/0080504 | A1* | 4/2010 | Shetrit ............... G02B 6/12004 385/14 |
| 2011/0058764 | A1* | 3/2011 | Kim ........................ G02F 1/025 385/2 |
| 2014/0127842 | A1* | 5/2014 | Song ....................... G02F 1/025 438/31 |

\* cited by examiner

*Primary Examiner* — David Vu
*Assistant Examiner* — Jonathan Han
(74) *Attorney, Agent, or Firm* — Chen Yoshimura LLP

(57) ABSTRACT

The invention provides methods of forming an optical device, in particular, a silicon optical modulator using shallow rib waveguide structure. According to the embodiments of the present invention, the silicon optical waveguide modulator includes a shallow rib waveguide with asymmetric shoulder heights disposed on a surface of a substrate; one side terminated by the waveguide edge and the other side terminated by a second laterally oriented PN junction, a first vertically oriented PN junction is positioned inside the light propagation region of the waveguide; and higher doping regions with the same type of doping type of the adjoining regions are positioned on the asymmetric shoulders outside the light propagation regions in electrical contact with metal contacts.

11 Claims, 7 Drawing Sheets

SILICON OPTICAL MODULATOR USING ASYMMETRIC SHALLOW WAVEGUIDE AND THE METHOD TO MAKE THE SAME

BACKGROUND OF THE INVENTION

Field of the Invention

The invention relates generally to optical devices. In particular, the invention relates to silicon based optical modulators.

Description of the Related Art

Optical modulators are the key component in optical communication systems. Optical modulators are devices that convert electrical signals to optical signals. An optical modulator is traditionally made of single crystal materials, such as lithium niobate (LiNO$_3$) or III-V semiconductors that have strong electro-optic effects. However, devices made of these materials tend to be expensive and are mostly deployed in telecommunication systems.

In recent years, high speed data communication becomes an emerging direction of optical communication. Data communication systems are very sensitive to cost. As a key component, optical modulators employed in data communication systems have to be low cost. Silicon photonics is an emerging technology that could provide low cost solutions for data communication systems. Naturally, a low cost silicon based optical modulator is highly demanded.

Since silicon is a very "passive" material, the only effect that can be used for optical modulation so far is the free-carrier effect. Silicon modulators based on free-carrier effect have been extensively studied in the past decade. Among them, modulators utilizing reverse biased PN diodes have been a promising approach to realize low cost high speed modulation. Under reverse bias, the depletion region of the PN diode junction enlarges, which results in a refractive index change of the waveguide and in turn optical phase change. Laterally oriented PN diodes are mostly employed due to the relatively simple fabrication process. However, small overlap between the depletion region and optical mode of the waveguide limits the modulation efficiency. On the other hand, vertically oriented PN diodes can provide higher modulation efficiency at the cost of more complicated process. In this case, the key is to reduce the optical loss induced by the high doping regions that is used to improve the ohmic contact between the metal electrodes and the silicon materials. The only way to achieve this is to position the high doping regions outside the light propagation region to reduce series resistance and maintain high speed performance, which makes the processes much more complicated. There is a need to well balance the optical loss and high speed performance of such devices without increasing the complicity of the fabrication process.

SUMMARY OF THE INVENTION

The present invention is directed to an optical device and related fabrication method that substantially obviates one or more of the problems due to limitations and disadvantages of the related art.

Additional features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, the present invention provides an optical device which includes: a substrate; an optical waveguide structure formed of an asymmetric rib structure, which includes a center region, and a higher slab region and a lower slab region at opposite sides of the rib structure, the higher slab region having a higher height than the lower slab region; a vertically-oriented PN diode formed inside the asymmetric rib structure of the optical waveguide structure, comprising a first doping layer and a second doping layer disposed on top of the first doping layer with opposite doping type, the first and second doping layers adjoining to form a vertical PN junction oriented substantially parallel to a top surface of the substrate, wherein the vertically-oriented PN junction is terminated on one side by an edge of the optical waveguide structure; a first higher doping region located in the lower slab region outside a light propagation region of the optical waveguide structure, the first higher doping region extending vertically to a surface of the substrate, the first higher doping region having a same doping type as and a higher doping concentration than the first doping layer; a second higher doping region located in the higher slab region outside the light propagation region of the optical waveguide structure, the second higher doping region penetrating the vertically oriented PN junction and extending vertically to the surface of the substrate, the second higher doping region having a same doping type as and a higher doping concentration than the second doping layer; a first metal contact being positioned in electrical contact with the first higher doping region; and a second metal contact being positioned in electrical contact with the second higher doping region.

It is to be understood that both the foregoing general description and the following detailed description are exemplary and explanatory and are intended to provide further explanation of the invention as claimed.

DETAILED DESCRIPTION OF THE PREFERRED EMBODIMENTS

The invention provides methods of forming an optical device, in particular, a silicon optical modulator using shallow rib waveguide structure fabricated on silicon-on-insulator (SOI) substrate. According to the embodiments of the present invention, the silicon optical modulator includes a shallow rib waveguide with asymmetric shoulder heights disposed on a surface of a SOI substrate; a first vertically oriented PN junction is positioned inside the light propagation region of the waveguide, wherein the vertical PN junction is terminated by the waveguide edge on one side and by a second laterally oriented PN junction on the other side; and higher doping regions with the same type of doping type of the adjoining regions are positioned on the asymmetric shoulders outside the light propagation regions in electrical contact with metal contacts. The light propagation region of an optical waveguide is usually defined by the area in which the optical mode extends.

Figure 1A:
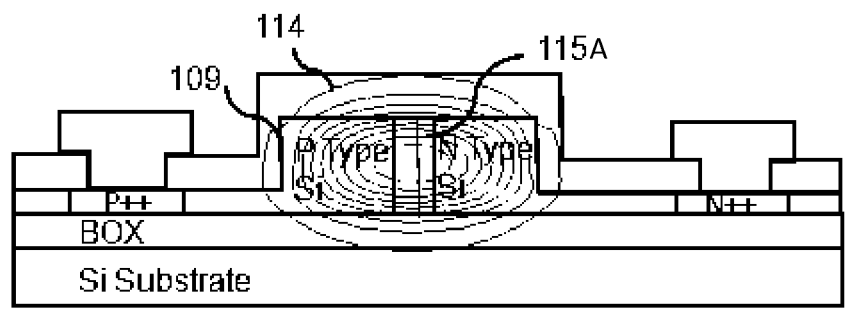
FIG. 1A (Prior Art) schematically illustrates the scenario of the depletion region of a silicon modulator using a lateral PN diode.
Figure 1B:
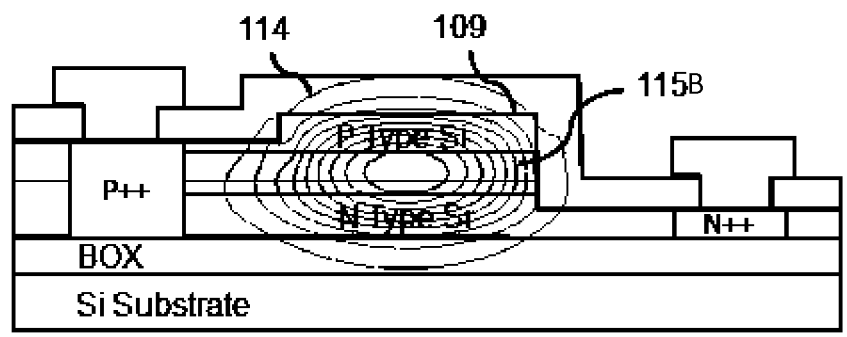
FIG. 1B schematically illustrates the scenario of the depletion region of an asymmetric shallow rib waveguide modulator using vertical PN diode overlapping with the optical mode of the waveguide under reverse bias.

FIG. 1A and FIG. 1B schematically illustrate a comparison of the optical mode overlapping with the depletion region of the modulator using a lateral PN diode (Prior Art) and a vertical PN diode. It is known that the modulation efficiency of a carrier depletion modulator highly depends on the overlap of the carrier depletion region 115A/115B of the PN junction and the optical mode 114. Given the dimension arrangement of the waveguide, that is the waveguide's lateral dimension is larger than the vertical dimension, the optical mode extends more in the lateral direction than the vertical direction. Such an optical mode profile is in favor of a vertically oriented PN diode in terms of modulation efficiency due to better overlap of the depletion region with the optical mode. Therefore, an optical modulator with vertical PN diode (as depicted in FIG. 1B) is more efficient than the one with lateral PN diode (Prior Art, as depicted in FIG. 1A).

Figure 1C:
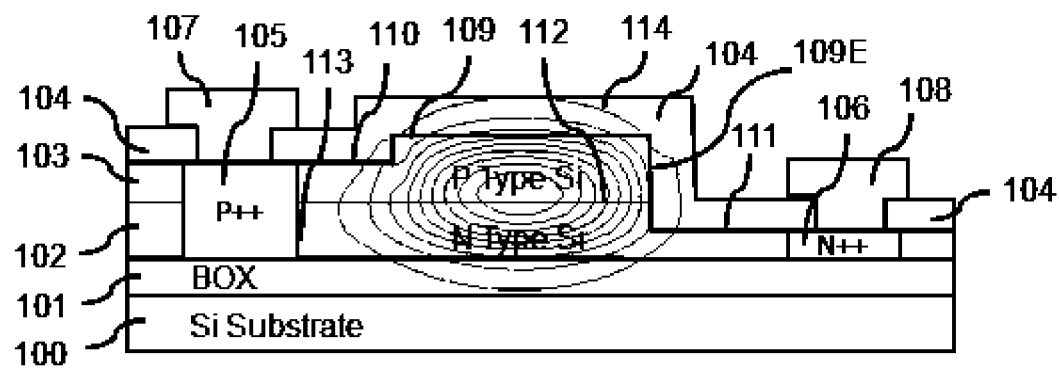
FIG. 1C schematically illustrates a cross-sectional view of an asymmetric shallow rib waveguide modulator device according to an embodiment of the present invention.

The key reason preventing wide use of vertical PN diode in waveguide modulator is the complicity of the fabrication processes. The complication is mainly caused by making the electrical contact with the PN diode. To achieve better high speed performance, it is required to reduce the ohmic contact resistance at the adjoining interface of the metal contacts 107/108 and the P-doped or N-doped layers 102/103 as depicted in FIG. 1C/1D. Usually higher doping regions 105/106 are inserted between the metal contacts 107/108 and the doped P or N layers 102/103. Due to the higher loss of the metal contacts 107/108 and the higher doping regions 105/106, it is necessary to position them outside the light propagation region so that the optical mode cannot "see" them. In the scenario of modulators with lateral PN diodes, it is convenient to position these regions outside the light propagation region given the lateral arrangement of PN junction and higher doping regions as depicted in FIG. 1A. However, in the case of modulators with vertical PN diodes, it is not so convenient to do so. Complicated process steps are involved to achieve this goal in previous efforts. It prevents the vertical PN diodes being commonly used in silicon modulators despite their better performances.

Figure 1D:
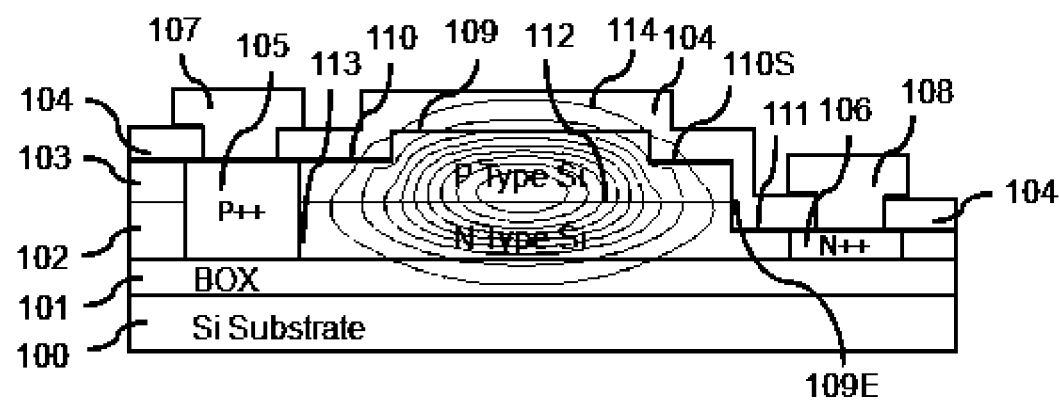
FIG. 1D schematically illustrates a cross-sectional view of an asymmetric shallow rib waveguide modulator device according to another embodiment of the present invention.

An embodiment of the present invention is described with reference to FIG. 1C. FIG. 1C schematically illustrates a schematic cross-sectional view of an exemplary optical modulator device. An alternative structure is illustrated in FIG. 1D. The optical modulator device includes a SOI substrate with silicon device layers (for example layer 102 and 103) on top of a buried oxide (BOX) 101 and a silicon substrate 100. A schematic cross-sectional view of an exemplary starting SOI substrate is illustrates in FIG. 2A. The optical modulator device further includes an optical waveguide structure formed of an asymmetric rib structure 109, which includes a center region (also pointed to by the reference symbol 109) between two slab regions 110 and 111; the two slab regions have different slab heights and are located on the opposite sides of the rib structure 109. The top surface of the slab region 110 is below the surface of the center region 109 and above the interface of the silicon device layers 102 and 103; the top surface of the slab region 111 is below the interface of the silicon device layers 102 and 103. Light propagates inside the waveguide 109 with a patterned power distribution: the optical mode profile 114. Given the asymmetry of the waveguide structure, the optical mode profile 114 shows a tighter confining on one side and loosely stretching on the other side. FIG. 1D schematically illustrates a cross-sectional view of an asymmetric shallow waveguide modulator device according to another embodiment of the present invention. In this embodiment, although the waveguide structure is asymmetric, the optical mode keeps symmetry by intentionally leaving a short higher slab region 110S before the PN junction is terminated by the edge of the waveguide 109E.

A vertically-oriented PN diode is formed inside the asymmetric rib waveguide 109 comprising a first doping layer 102 and a second doping layer 103 disposed on top of the first doping layer 102 with opposite doping type, the first and second doping layers (102 and 103) adjoining to form a first vertical PN junction 112 oriented substantially parallel to the top surface of the substrate 100, wherein the first vertically-oriented PN junction 112 is terminated on one side by the waveguide edge 109E and on the other side by a second lateral-oriented PN junction 113 which is the junction between the higher doping region 105 and the P-doped or N-doped layers 102/103. A first higher doping region 106 is positioned in the slab region 111 with lower height outside the light propagation region of the optical waveguide 109, wherein the light propagation region of an optical waveguide refers to the area in which the optical mode extends. Noted that the light propagation region can be larger than the physical structure of the optical waveguide due to the weak confinement of the structure. The first higher doping region 106 extends vertically to the surface of the substrate (BOX layer 101). The first higher doping region 106 has the same doping type as and a higher doping concentration than the first doping layer 102.

A second higher doping region 105 is positioned in the slab region 110 with higher height outside the light propagation region of the optical waveguide 109. The second higher doping region 105 penetrates the first vertically oriented PN junction 112 and extending vertically to the surface of the substrate (BOX layer 101). The second higher doping region 105 has the same doping type as and a higher doping concentration than the second doping layer 103. When the first doping layer 102 is P-type, the second doping layer 103 is N-type; when the first doping layer 102 is N-type, the second doping layer 103 is P-type.

A first metal contact 108 is positioned in electrical contact with the first higher doping region 106 and a second metal contact 107 is positioned in electrical contact with the second higher doping region 105 after an oxide cladding layer 104 is disposed on top of the waveguide 109.

A first depletion region 115B (see e.g. FIG. 1B) exists in a vicinity of the vertically oriented PN junction 112 and a second depletion region (not shown in the figure) exists in a vicinity of the second laterally oriented PN junction 113 when no driving voltage is applied to the first and second metal contacts 107/108. The first depletion region 115B is located inside the light propagation region and the second depletion region is located outside the light propagation region. When a driving voltage is applied to the first and second metal contacts 107/108, the first depletion region 115B extends perpendicularly to the vertically oriented PN-junction interface 112 to fill more light propagation region; when the highest light power density is present, the extended depletion region overlaps the optical mode in the light propagation region and results in an optical refractive index of the optical waveguide modulating associated with the applied driving voltage. Such refractive index modulation in turn leads to optical phase modulation and optical intensity modulation (when a Mach-Zehnder Interferometer is used). The more the extended depletion region overlaps with the optical mode, the higher the modulation efficiency. Given the short-wide shape of the optical mode of the optical waveguide as depicted in FIGS. 1B-1D, it is natural to use a vertical PN junction which provides more overlap between the extended depletion region and the optical mode.

Figure 2A:
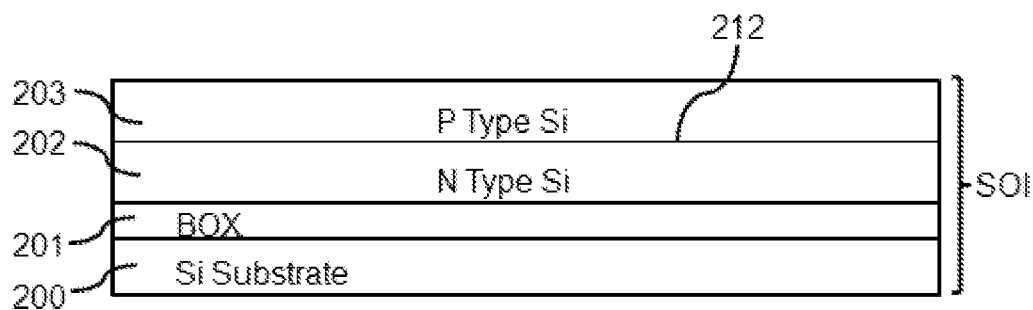
FIGS. 2A-2H schematically illustrate the steps of a self-aligned process for fabricating the asymmetric shallow waveguide modulator illustrated in FIG. 1C.
Figure 2B:
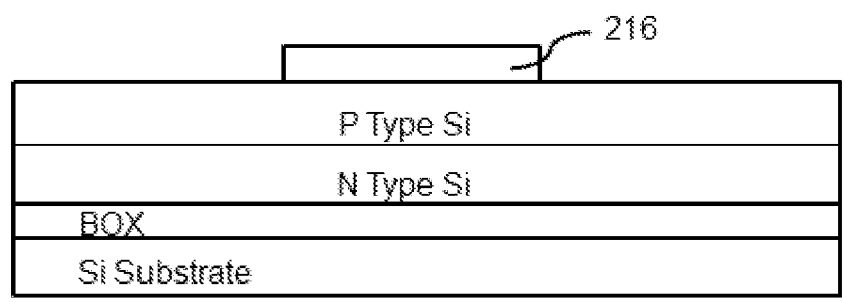
Figure 2C:
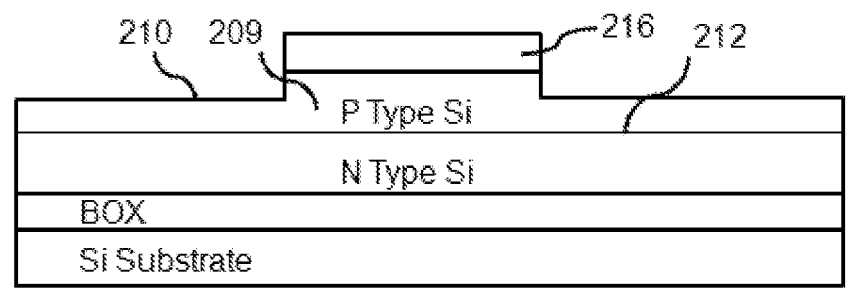

FIGS. 2A-2H schematically illustrate the steps of a self-aligned process steps of fabricating an exemplary asymmetric shallow waveguide modulator illustrated in FIG. 1C. The process begins with a double doped SOI substrate as illustrated in FIG. 2A, wherein the substrate includes a silicon substrate 200, a BOX layer 201 and two oppositely doped layers 202 and 203 with an interface 212. Such a substrate can be prepared by double doping process or multilayer epitaxial growth. The next step is to form a patterned hard mask 216 on top of the SOI substrate to define the waveguide critical dimensions (FIG. 2B). The hard mask can be made of but is not limited to $SiO_2$, $Si_3N_4$, or other material. A shallow-etched rib waveguide 209 is formed by etching the substrate with standard silicon dry etch approach (first etching step) (FIG. 2C). The etching process stops when the etching depth reaches the designated slab height of the higher slab region 210. The first etching step should make sure that the remaining slab height is higher than the vertical PN junction interface 212.

Figure 2D:
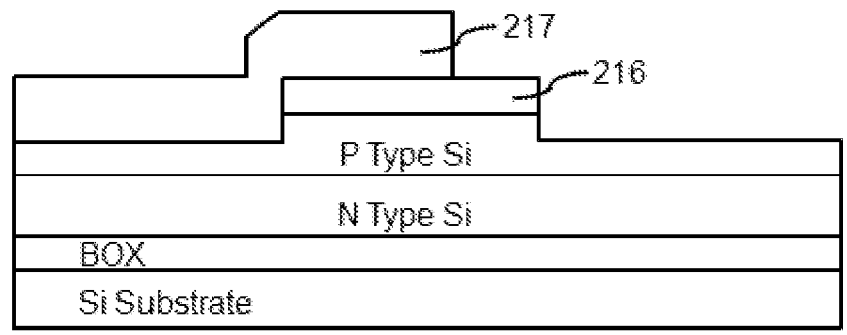
Figure 2E:
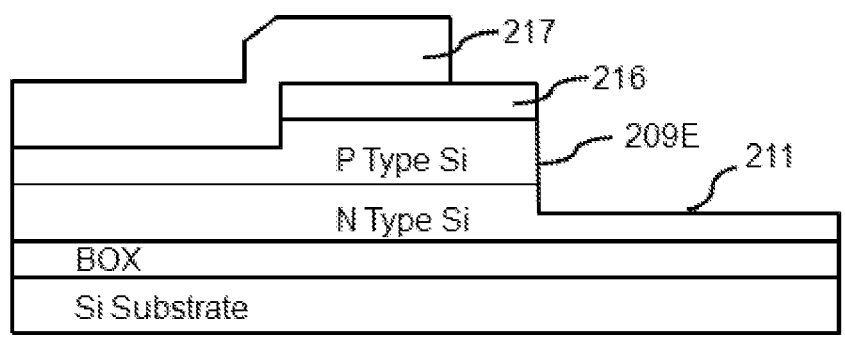

A second layer of photoresist 217 is then disposed on top of the hard mask 216 and patterned to cover one side of the waveguide edge and leave the other side exposed as depicted in FIG. 2D. Since the waveguide edge has been well-defined by the hard mask 216, the edge position of the second photoresist layer become not so critical. Or in other words, this step is self-aligned. The waveguide is further etched until the height of lower slab region 211 reaches the designated value as depicted in FIG. 2E (second etching step). Thus, an asymmetric rib waveguide with well defined edge 209E is fabricated by the described self-aligned process. The second etching step should make sure that the remaining slab region 211 has a height lower than the vertical PN junction interface 212.

Figure 2F:
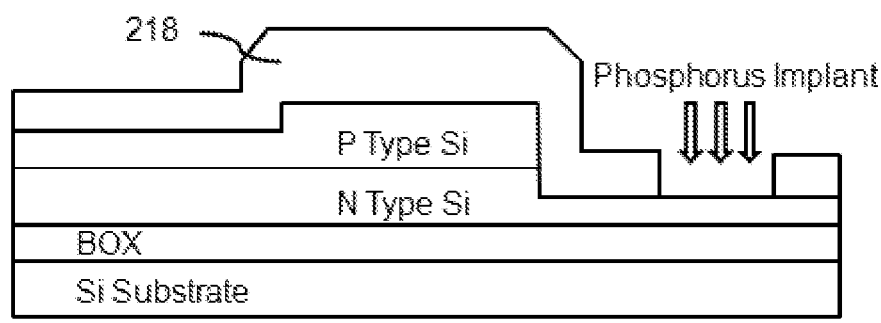
Figure 2G:
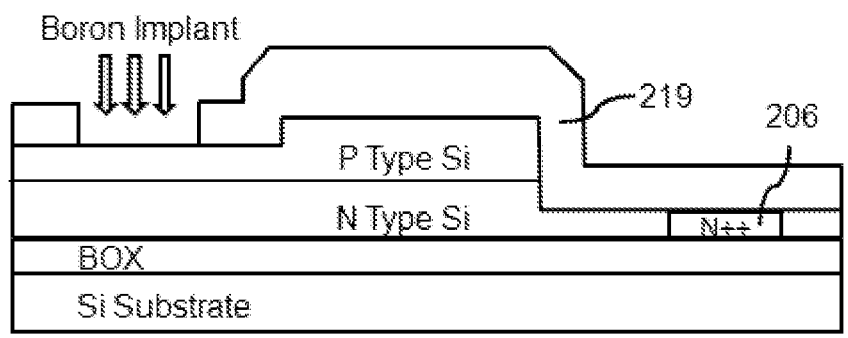
Figure 2H:
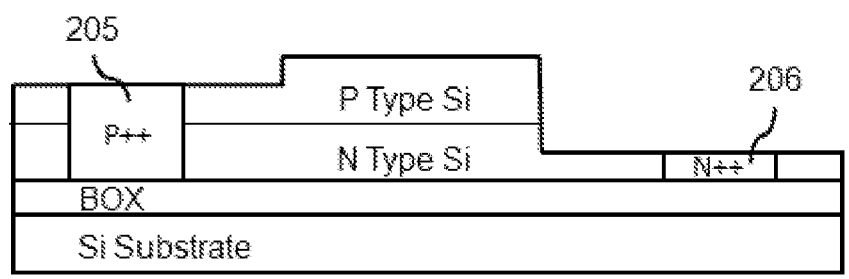

Two higher doping regions 206 and 205 are defined by respectively disposing and patterning the photoresist layers 218 and 219, then respectively doping with phosphorus and boron in the silicon slab 211 and 210 as depicted in FIG. 2F and FIG. 2G. In both cases, the higher doping regions are required to reach the surface of the SOI BOX layer. FIG. 2H schematically illustrates a structure with the waveguide and the PN diodes done formed by the above steps. The final steps (not shown in the drawings) involve disposing a cladding layers and patterning metal contacts, which are all standard process steps.

Figure 3A:
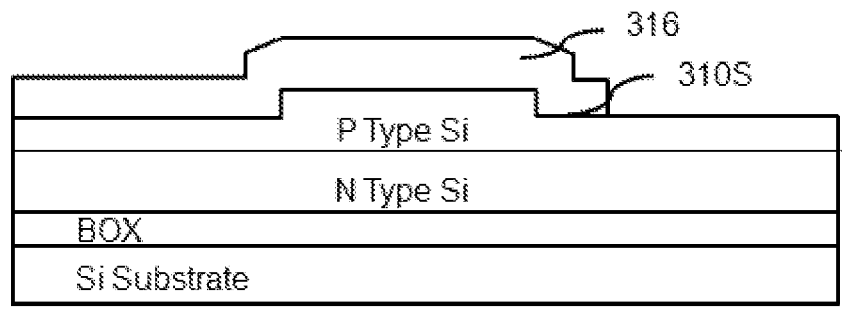
FIGS. 3A-3B schematically illustrate the key process steps for fabricating the asymmetric shallow rib waveguide modulator illustrated in FIG. 1D.
Figure 3B:
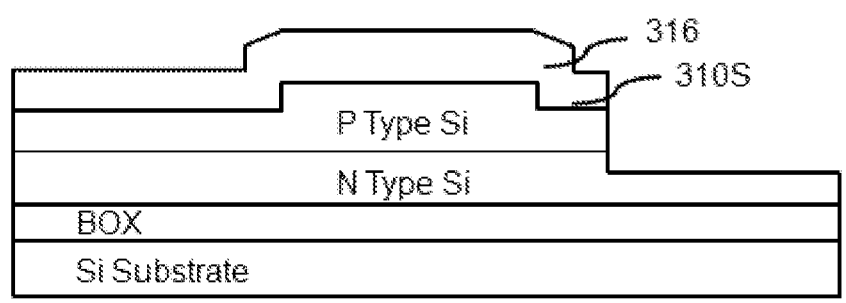

An asymmetric rib waveguide with symmetric optical mode depicted in FIG. 1D is an alternative structure to realize a silicon waveguide modulator with a vertical PN diode. FIGS. 3A-3B schematically illustrates the key process steps of fabricating the asymmetric shallow rib waveguide. Instead of following the step in FIG. 2D to defined a self-aligned waveguide edge, FIG. 3A defines a short length of the higher slab region 310S (110S in FIG. 1D) using photoresist layer 316 such that the optical mode "sees" the symmetric waveguide structure. The waveguide is then etched to form the optically symmetric waveguide with an asymmetric rib structure as depicted in FIG. 3B. The other steps are similar to that shown in FIGS. 2A-2C and 2F-2H.

Figure 4A:
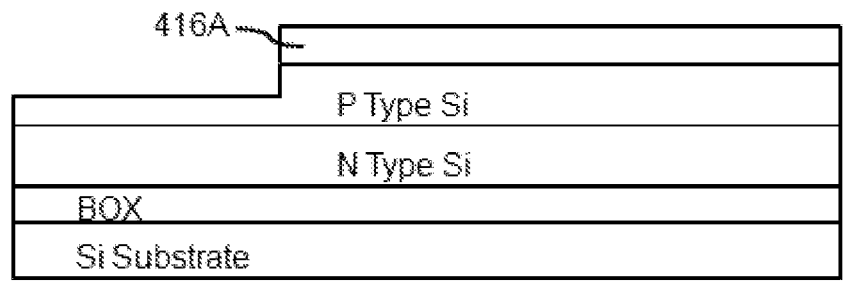
FIGS. 4A-4B schematically illustrate the key process steps of an alternative approach for fabricating the asymmetric shallow rib waveguide modulator illustrated in FIG. 1C.
Figure 4B:
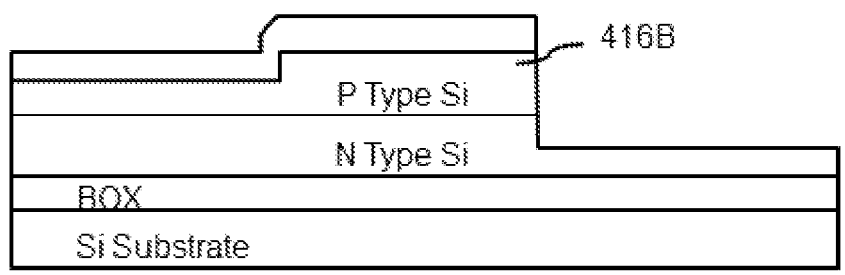

The self-align process depicted in FIGS. 2C-2E provide a well defined waveguide with better critical dimension control. The process may cause a sidewall kink at the double etched waveguide edge 209E. There are alternative approaches to fabricating the asymmetric rib waveguide depicted in FIG. 1C. FIGS. 4A-4B schematically illustrate the key process steps of an alternative approach of fabricating the asymmetric shallow rib waveguide modulator illustrated in FIG. 1C. This exemplary alternative approach shares most of the process steps depicted in FIGS. 2A-2H except the steps in FIGS. 2C-2E. Instead of making a self-aligned hard mask/photoresist stack, the alternative approach simply patterns photoresist layers (416A and 416B respectively) and etches two times to separately define the two edges of the asymmetric rib waveguide. Since each waveguide side wall (edge) is etched separately in one step, the side wall kink is avoided. This alternative approach needs a high precision control of the waveguide critical dimensions.

The waveguide modulator structure described in this disclosure aims at forming a phase modulator by modulate the refractive index of the waveguide material—silicon. An intensity modulator can be realized by using a Mach-Zehnder interferometer structure.

It will be apparent to those skilled in the art that various modification and variations can be made in the optical system and related fabrication methods of the present invention without departing from the spirit or scope of the invention. Thus, it is intended that the present invention cover modifications and variations that come within the scope of the appended claims and their equivalents.

What is claimed is:

1. An optical device comprising:
a substrate having an insulating layer;
an optical waveguide structure on top of the insulating layer, formed of an asymmetric rib structure, which includes a center region, and a higher slab region and a lower slab region at opposite sides of the rib structure, the higher slab region having a higher height than the lower slab region;
a vertically-oriented PN diode formed inside the asymmetric rib structure of the optical waveguide structure, comprising a first doping layer and a second doping layer disposed on top of the first doping layer with opposite doping type, the first and second doping layers adjoining to form a vertical PN junction oriented substantially parallel to a top surface of the substrate, wherein the vertically-oriented PN junction is terminated on one side by an edge of the optical waveguide structure;
a first higher doping region located in the lower slab region outside a light propagation region of the optical waveguide structure, the first higher doping region extending vertically to a surface of the substrate, the first higher doping region having a same doping type as and a higher doping concentration than the first doping layer;
a second higher doping region located in the higher slab region outside the light propagation region of the optical waveguide structure, the second higher doping region directly contacting both the first doping layer and the second doping layer and penetrating the vertically oriented PN junction and extending vertically to directly contact the surface of the insulating layer of the substrate, the second higher doping region having a same doping type as and a higher doping concentration than the second doping layer;

a first metal contact being positioned in electrical contact with the first higher doping region; and a second metal contact being positioned in electrical contact with the second higher doping region.

2. The optical device of claim 1, wherein the first doping layer partially fills the asymmetric rib structure and extends to the higher and lower slab regions and substantially fills the lower slab region and partially fills the higher slab region, wherein the second doping layer partially fills a remaining portion of the asymmetric rib structure and extends horizontally to a remaining portion of the higher slab region and is terminated by the edge of the optical waveguide structure on the lower slab side.

3. The optical device of claim 2, wherein a height of the first doping layer is larger than a height of the lower slab region such that the vertically-oriented PN junction is terminated by the edge of the optical waveguide structure and no PN junction exists in the lower slab region.

4. The optical device of claim 2, wherein a height of the first doping layer is smaller than a height of the higher slab region such that a PN junction exists in the asymmetric rib structure and extends horizontally across the higher slab region and is terminated by a second lateral PN junction.

5. The optical device of claim 1, wherein a second laterally oriented PN junction exists at an interface of the first doping layer and the second higher doping region outside the propagation region.

6. The optical device of claim 1, wherein the first doping layer is P-type and the second doping layer is N-type, or the first doping layer is N-type and the second doping layer is P-type.

7. The optical device of claim 6, wherein a first depletion region exists in a vicinity of the vertically oriented PN junction and a second depletion region exists in a vicinity of the second laterally oriented PN junction when no driving voltage is applied to the first and second metal contacts.

8. The optical device of claim 7, wherein the first depletion region is located inside the light propagation region and the second depletion region is located outside the light propagation region.

9. The optical device of claim 7, wherein when a driving voltage is applied to the first and second metal contacts, the first depletion region extends perpendicularly to the vertically oriented PN-junction interface to fill more light propagation region; and wherein when the highest light power density is present, the extended depletion region overlaps the light propagation region.

10. The optical device of claim 1, wherein the substrate is silicon-on-insulator and the optical waveguide is formed of silicon.

11. The optical device of claim 1, wherein the center region of the optical waveguide structure has a higher height than the higher slab region.

\* \* \* \* \*